US012566522B2

(12) United States Patent (10) Patent No.: US 12,566,522 B2
Lin et al. (45) Date of Patent: Mar. 3, 2026

(54) TOUCH DEVICE AND CONTROL METHOD THEREOF

(71) Applicant: Silicon Integrated Systems Corp., Hsinchu City (TW)

(72) Inventors: Yung jui Lin, Hsinchu City (TW); Wei-en Shih, Hsinchu City (TW); Keng-nan Chen, Hsinchu City (TW)

(73) Assignee: Silicon Integrated Systems Corp., Hsinchu City (TW)

( * ) Notice: Subject to any disclaimer, the term of this patent is extended or adjusted under 35 U.S.C. 154(b) by 0 days.

(21) Appl. No.: 19/095,809

(22) Filed: Mar. 31, 2025

(65) Prior Publication Data

US 2025/0321660 A1     Oct. 16, 2025

(30) Foreign Application Priority Data

Apr. 12, 2024    (TW) ................................. 113113760

(51) Int. Cl.
| *G06F 3/04847* | (2022.01) |
| *G06F 3/041* | (2006.01) |
| *G06F 3/044* | (2006.01) |

(52) U.S. Cl.
CPC ........ G06F 3/04184 (2019.05); G06F 3/0447 (2019.05); G06F 3/04847 (2013.01)

(58) Field of Classification Search
CPC . G06F 3/04184; G06F 3/0447; G06F 3/04847
See application file for complete search history.

(56) References Cited

U.S. PATENT DOCUMENTS

| 10,409,470 B2 * | 9/2019 | Powell ................. G06F 3/0338 |
| 2006/0256090 A1 | 11/2006 | Huppi |
| 2007/0262963 A1 | 11/2007 | Xiao-Ping et al. |

(Continued)

FOREIGN PATENT DOCUMENTS

| CN | 115079867 A | 9/2022 |
| JP | 2018160025 A | 10/2018 |

(Continued)

OTHER PUBLICATIONS

Search Report of Taiwan Patent Application 113113760, Mailed Mar. 4, 2014.

(Continued)

*Primary Examiner* — Kevin M Nguyen
(74) *Attorney, Agent, or Firm* — The Roy Gross Law Firm, LLC; Roy D. Gross

(57) ABSTRACT

A touch device and a touch device control method are provided. The touch device includes: a touch screen has a button body placement portion and a touch control portion located outside the button body placement portion; a capacitive button disposed on the touch screen and in the button body placement portion; a sensing device configured to sense first data at the button body placement portion and second data at the touch control portion; a computing unit configured to calculate a parameter adjustment amount for balancing a signal-to-noise ratio between the button body placement portion and the touch control portion based on the first data and the second data; and a balancing unit configured to regulate the touch screen according to the parameter adjustment amount.

10 Claims, 4 Drawing Sheets

(56) References Cited

U.S. PATENT DOCUMENTS

| | | | |
|---|---|---|---|
| 2012/0228109 A1 | 9/2012 | Wang et al. | |
| 2013/0069895 A1 | 3/2013 | Lo et al. | |
| 2016/0313858 A1* | 10/2016 | Chan | G06F 3/0418 |
| 2017/0153763 A1* | 6/2017 | Vavra | G06F 3/0442 |
| 2017/0192534 A1 | 7/2017 | Han et al. | |

FOREIGN PATENT DOCUMENTS

| | | | |
|---|---|---|---|
| JP | 2018180916 A | 11/2018 |
| JP | 2020107099 A | 7/2020 |
| KR | 20180063175 A | 6/2018 |
| KR | 20220092677 A | 7/2022 |
| TW | 201337696 A | 9/2013 |
| WO | 2015056550 A1 | 4/2015 |
| WO | 2015174092 A1 | 11/2015 |

OTHER PUBLICATIONS

Japanese Office Action for corresponding Japanese Patent Application No. 2025-031508, dated Sep. 2, 2025, pp. 1-4, 8pp.
Korean Office Action for Korean Patent Application No. 10-2024-0077642, dated Jun. 10, 2025, 9pp.

* cited by examiner

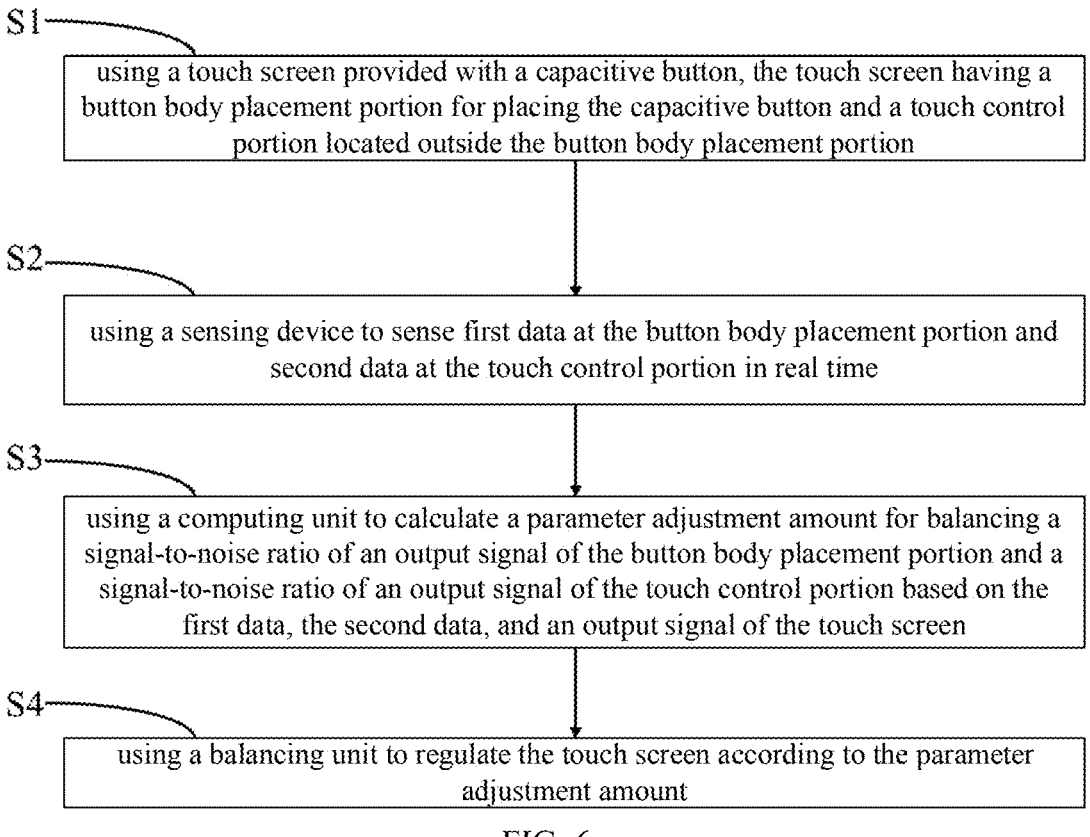

S1 using a touch screen provided with a capacitive button, the touch screen having a button body placement portion for placing the capacitive button and a touch control portion located outside the button body placement portion

S2 using a sensing device to sense first data at the button body placement portion and second data at the touch control portion in real time

S3 using a computing unit to calculate a parameter adjustment amount for balancing a signal-to-noise ratio of an output signal of the button body placement portion and a signal-to-noise ratio of an output signal of the touch control portion based on the first data, the second data, and an output signal of the touch screen

S4 using a balancing unit to regulate the touch screen according to the parameter adjustment amount

FIG. 6

S21 using the sensing device to sense the first data including elastic portion charge state data of the elastic portion that changes with a deformation quantity of the elastic portion

S22 using the computing unit to calculate the parameter adjustment amount according to the first data including the elastic portion charge state data

FIG. 7

S31 using the computing unit to calculate a signal output threshold value
according to the first data

S32 using the computing unit to determine whether the output signal
generated at the button body placement portion is greater than the
signal output threshold value

TOUCH DEVICE AND CONTROL METHOD THEREOF

CROSS REFERENCE TO RELATED APPLICATIONS

This application claims priority to Taiwan Application Serial No. 113113760, filed Apr. 12, 2024, the disclosure of which is incorporated herein by reference.

TECHNICAL FIELD

The present application relates to a touch device, and more particularly to a touch device including integrated physical buttons and a touch screen, and a touch device control method.

BACKGROUND TECHNOLOGY

In the prior art, when adding a button to a panel, it is often necessary to manufacture a mold for an adding location of the button according to a mechanism of the adding location of the button, and to set a circuit accordingly to match the newly added button. Therefore, a cost of adding button remains high, and application fields of the panel also limit types of buttons that can be added.

In addition, the panel with the additional button is more likely to receive signal noise transmitted from the additional button, causing a touch device with the additional button to be subject to more electromagnetic interference or capacitive interference, resulting in a worse effect of receiving sensing signals. As a result, the panel is prone to inaccurate determination of whether it is touched or pressed, and is not suitable for application scenarios that require responding to signal changes in a very short time.

In view of this, it is necessary to provide a touch device and a touch device control method to solve the above technical problems.

SUMMARY OF INVENTION

In order to solve the above problems of the prior art, a purpose of the present application is to provide a touch device and a control method thereof, which can make the touch device with an additional panel button have a faster response speed and can make applicable fields of the touch device not limited.

In a first aspect, the present application provides a touch device, including: a capacitive button; a touch screen, the capacitive button being disposed on the touch screen, the touch screen having a button body placement portion for placing the capacitive button and a touch control portion located outside the button body placement portion; a sensing device connected to the touch screen and the capacitive button, and configured to sense first data at the button body placement portion and second data at the touch control portion in real time; a computing unit connected to the sensing device, and configured to calculate a parameter adjustment amount for balancing a signal-to-noise ratio of an output signal of the button body placement portion and a signal-to-noise ratio of an output signal of the touch control portion based on the first data and the second data; and a balancing unit connected to the computing unit, and configured to regulate the touch screen according to the parameter adjustment amount.

In some embodiments of the present application, the capacitive button includes a contact portion, and when the capacitive button is pressed down, the contact portion is electrically connected to the touch screen.

In some embodiments of the present application, the capacitive button further includes an elastic portion, the contact portion is connected to the elastic portion and is located at a lower edge of the elastic portion, and when the capacitive button is pressed down, the elastic portion is compressed to electrically connect the contact portion to the touch screen.

In some embodiments of the present application, the elastic portion is made of a conductive material, and an elastic portion charge of the elastic portion changes with a deformation quantity of the elastic portion, and the first data sensed by the sensing device further includes elastic portion charge state data of a change amount in the elastic portion charge; and the computing unit is further configured to calculate the parameter adjustment amount according to the first data including the elastic portion charge state data.

In some embodiments of the present application, the computing unit is further configured to calculate a signal output threshold value according to the first data; the computing unit is further configured to determine whether the output signal generated at the button body placement portion is greater than the signal output threshold value; when the output signal is greater than the signal output threshold value, the touch screen receives the output signal.

In a second aspect, the present application also provides a touch device control method, including: using a touch screen provided with a capacitive button, the touch screen having a button body placement portion for placing the capacitive button and a touch control portion located outside the button body placement portion; using a sensing device to sense first data at the button body placement portion and second data at the touch control portion in real time; using a computing unit to calculate a parameter adjustment amount for balancing a signal-to-noise ratio of the button body placement portion and the touch control portion based on the first data and the second data; and using a balancing unit to regulate the touch screen according to the parameter adjustment amount.

In some embodiments of the present application, the touch device control method further includes: pressing the capacitive button to electrically connect a contact portion of the capacitive button and the touch screen.

In some embodiments of the present application, the touch device control method further includes: pressing the capacitive button to compress an elastic portion of the capacitive button so that the contact portion located at a lower edge of the elastic portion is electrically connect to the touch screen.

In some embodiments of the present application, the touch device control method further includes: using the sensing device to sense the first data including elastic portion charge state data of the elastic portion that changes with a deformation quantity of the elastic portion; using the computing unit to calculate the parameter adjustment amount according to the first data including the elastic portion charge state data.

In some embodiments of the present application, the touch device control method further includes: using the computing unit to calculate a signal output threshold value according to the first data; and using the computing unit to determine whether the output signal generated at the button body placement portion is greater than the signal output threshold value; using the touch screen to receive the output signal when the output signal is greater than the signal output threshold value.

Compared with the prior art, the present application provides the touch device and the control method thereof. The capacitive button is disposed on the touch screen. The button body placement portion and the touch control portion are sensed in real time by the sensing device, so that the signal-to-noise ratio of the output signals in different regions of the touch device can be balanced through the computing unit and balancing unit. In this way, button elements can provide physical feedback on the touch screen by utilizing a simplified system design without limiting original functions of the touch screen. At the same time, the touch device with additional panel buttons can have a faster response speed. Also, applicable fields of the touch device are not limited by difficulty of circuit modification, electric field interference, and capacitance interference.

The following is a detailed description of specific embodiments in conjunction with accompanying drawings, which will make it easier to understand the purpose, technical content, characteristics, and effects achieved by this application.

BRIEF DESCRIPTION OF THE DRAWINGS

FIG. 6 is a flowchart of a touch device control method according to an embodiment of the present application.

FIG. 7 is a flowchart of a touch device control method according to another embodiment of the present application.

DETAILED DESCRIPTION OF THE EMBODIMENTS

Figure 1:
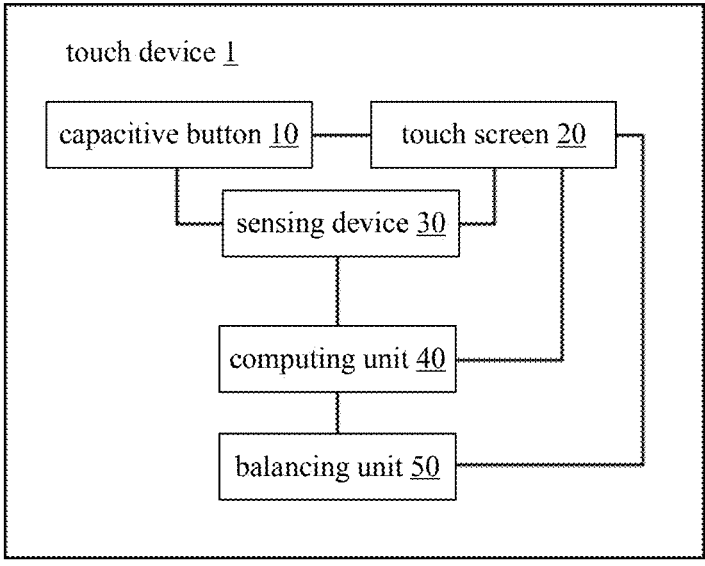
FIG. 1 is a block diagram of a touch device according to an embodiment of the present application.

Technical solutions in the embodiments of the present application will be clearly and completely described below in conjunction with the accompanying drawings in the embodiments of the present application. Apparently, the described embodiments are only part of the embodiments of the present application, rather than all the embodiments. In addition, it should be understood that the specific embodiments described herein are only used to illustrate and explain the present application, and are not used to limit the present application. In the drawings, the same or similar reference numerals represent the same or similar element.

First, refer to FIG. 1, which is a block diagram of a touch device according to an embodiment of the present application. The touch device 1 provided in the present application includes: a capacitive button 10, a touch screen 20, a sensing device 30, a computing unit 40, and a balancing unit 50. The capacitive button 10 is disposed on the touch screen 20. The touch screen 20 has a button body placement portion A1 where the capacitive button 10 is placed and a touch control portion A2 located outside the button body placement portion A1. The sensing device 30 is connected to the touch screen 20 and the capacitive button 10, and is configured to sense first data at the button body placement portion A1 and second data at the touch control portion A2 in real time. The computing unit 40 is connected to the sensing device 30 and the touch screen 20, and is configured to calculate a parameter adjustment amount for balancing a signal-to-noise ratio of an output signal of the button body placement portion and a signal-to-noise ratio of an output signal of the touch control portion based on the first data, the second data, and an output signal of the touch screen 20. The balancing unit 50 is connected to the computing unit 40 and the touch screen 20, and is configured to regulate the touch screen 20 according to the parameter adjustment amount.

The sensing device 30 may be a charge sensor for measuring or calculating the corresponding material charge when the material is deformed by stress.

The capacitive button 10 provided in the present application is directly disposed on the touch screen 20 having an existing touch function. Based on a change in surface charge of the button body placement portion A1 of the touch screen 20 caused by disposing the capacitive button 10, the present application simplifies a measurement of corresponding signal-to-noise ratio. The data of the button body placement portion A1 and the touch control portion A2 are measured through the sensing device 30 directly connected to the touch screen 20 and the capacitive button 10. The computing unit 40 directly calculates the parameter adjustment amount of the touch screen 20 on which the capacitive button 10 is placed for balancing the button body placement portion A1 and the touch control portion A2 according to the first data, the second data, and the output signal of the touch screen 20. Therefore, the present application combines the provided capacitive button 10, touch screen 20, and sensing device 30, and does not need to individually measure an output signal strength and a noise strength of the button body placement portion A1, and an output signal strength and a noise strength of the touch control portion A2 in real time, and can directly and accurately balance the signal-to-noise ratio of the output signals of the button body placement portion A1 and the touch control portion A2. The first data may include capacitance data and/or charge data of the button body placement portion A1. The second data may include capacitance data and/or charge data of the touch control portion A2.

Figure 2:
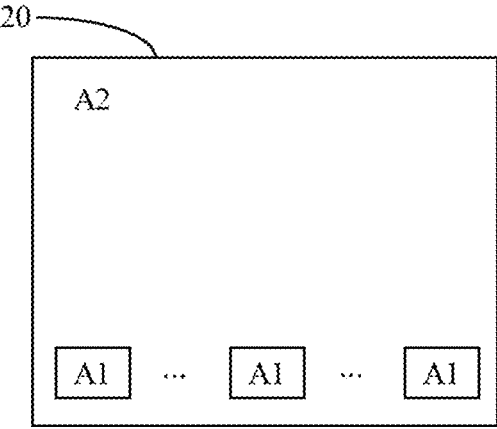
FIG. 2 is a schematic diagram showing a distribution of a button body placement portion and a touch control portion on a touch screen according to an embodiment of the present application.

Referring to FIG. 2, which is a schematic diagram showing a distribution of a button body placement portion and a touch control portion on a touch screen according to an embodiment of the present application. On the touch screen 20, the button body placement portion A1 is arranged at a bottom of the touch screen 20. Therefore, on the touch screen 20 with a large-area, a user who needs a physical button to assist in using the touch screen 20 can approach the touch screen 20 and press the capacitive button 10 disposed on the button body placement portion A1 to make the touch screen 20 generate an input signal.

Figure 3:
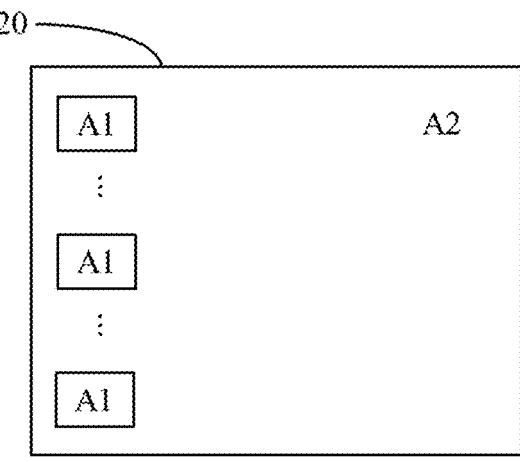
FIG. 3 is a schematic diagram showing a distribution of a button body placement portion and a touch control portion on a touch screen according to another embodiment of the present application.

Alternatively, referring to FIG. 3, which is a schematic diagram showing a distribution of a button body placement portion and a touch control portion on a touch screen according to another embodiment of the present application. On the touch screen 20, the button body placement portion A1 is arranged on one side of the touch screen 20. Therefore, a user can make the touch screen 20 generate an input signal by pressing the capacitive button 10 disposed on the button body placement portion A1 at an edge of the touch screen 20.

Figure 4:
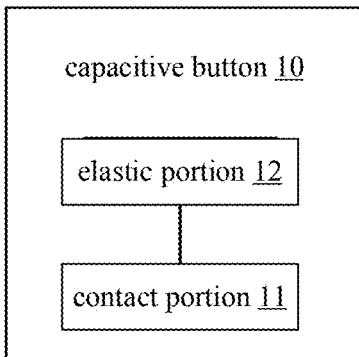
FIG. 4 is a block diagram of a capacitive button according to an embodiment of the present application.

Next, it is necessary to further explain the block diagram of the capacitive button 10 of the present application. Refer to FIG. 4, the capacitive button 10 includes a contact portion 11 and an elastic portion 12. When the capacitive button 10 is pressed down, the contact portion 11 is electrically connected to the touch screen 20. In addition, the elastic portion 12 is made of a conductive material, such as conductive rubber. When the capacitive button 10 is disposed on the touch screen 20, the elastic portion 12 has a space inside that is sufficient to accommodate the contact portion 11. The contact portion 11 is connected to the elastic portion 12 and is located at a lower edge of the elastic portion 12. Therefore, an electromagnetic interference signal transmitted from an outside of the capacitive button 10 can be directly blocked by the elastic portion 12 without affecting the contact portion 11 inside thereof. It should also be noted that the elastic portion 12 is directly connected to a pressing mechanism of the capacitive button 10. Therefore, when the user presses the capacitive button 10, the elastic portion 12 will be compressed accordingly.

Figure 5:
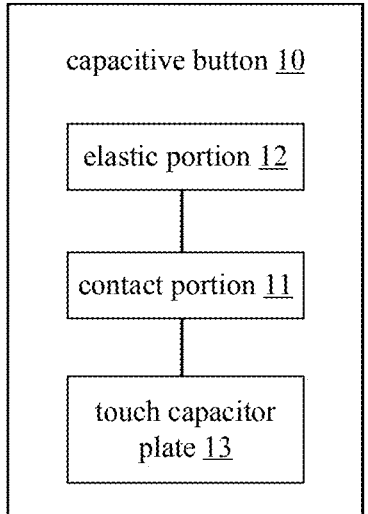
FIG. 5 is a block diagram of a capacitive button according to another embodiment of the present application.

Next, the present application further provides another embodiment of the capacitive button 10. Refer to FIG. 5, the capacitive button 10 includes a contact portion 11, an elastic portion 12, and a touch capacitor plate 13. The touch capacitor plate 13 is disposed on the touch screen 20. When the capacitive button 10 is pressed down, the contact portion 11 is electrically connected to the touch capacitor plate 13. Through the setting of the touch capacitor plate 13, a signal outputted from the capacitive button 10 to the touch screen 20 is amplified. Therefore, the contact portion 11 can have a smaller volume and a smaller bottom contact area while ensuring a signal transmission of the touch device.

In another embodiment of the present application, the elastic portion 12 is also connected to the touch screen 20. The elastic portion 12 is made of a conductive material, and an elastic portion charge of the elastic portion 12 changes with a deformation quantity of the elastic portion. The first data sensed by the sensing device 30 provided in the present application also includes elastic portion charge state data of a change amount of the charge of the elastic portion 12. The computing unit 40 is also configured to calculate the parameter adjustment amount according to the first data including the elastic portion charge state data. Thus, the present application can also regulate operating parameters of the touch screen 20 in real time through the balancing unit 50 in response to a pressing state of the capacitive button 10.

In another embodiment of the present application, the computing unit 40 is further configured to calculate a signal output threshold value according to the first data. The computing unit 40 is also configured to determine whether the output signal generated at the button body placement portion is greater than the signal output threshold value. When the output signal is greater than the signal output threshold value, the balancing unit 50 controls the touch screen 20 to receive the output signal. Thus, the present application can further identify whether the capacitive button 10 has been pressed, and only after it is identified as being pressed, the touch screen 20 receives the output signal transmitted from the button body placement portion A1.

Figure 8:
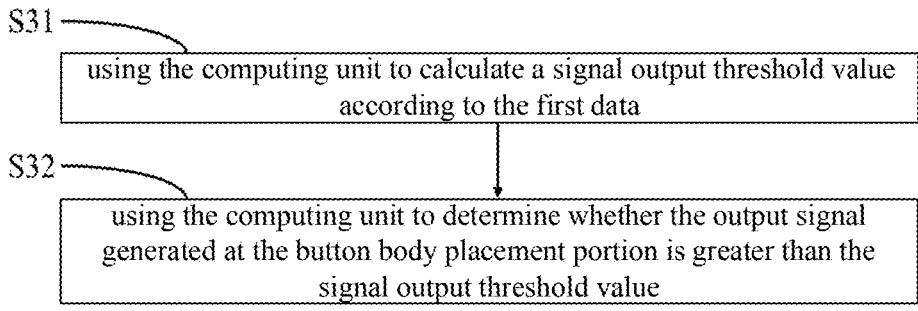
FIG. 8 is a flowchart of a touch device control method according to another embodiment of the present application.

Please refer to FIG. 6 to FIG. 8, which respectively disclose different embodiments of the touch device control method provided by the present application.

First, please refer to FIG. 6, the present application provides a touch device control method, including:

S1: using a touch screen provided with a capacitive button, the touch screen having a button body placement portion for placing the capacitive button and a touch control portion located outside the button body placement portion.

Thus, the touch screen 20 is divided into the button body placement portion A1 where the capacitive button 10 is placed and the touch control portion A2 located outside the button body placement portion A1 to improve an operating performance of the touch device combining a physical button and the touch screen provided by the present application.

S2: using a sensing device to sense first data at the button body placement portion and second data at the touch control portion in real time.

Thus, by sensing the first data at the button body placement portion A1 and the second data at the touch control portion A2 in real time, a change in a pressing state of the capacitive button 10 on the button body placement portion A1 is evaluated in real time, so as to improve an accuracy of output signals of the button body placement portion A1 and the touch control portion A2 of the present application.

S3: using a computing unit to calculate a parameter adjustment amount for balancing a signal-to-noise ratio of an output signal of the button body placement portion and a signal-to-noise ratio of an output signal of the touch control portion based on the first data, the second data, and an output signal of the touch screen.

By comparing the first data, the second data, and the output signal of the touch screen, the present application can acquire the parameter adjustment amount for balancing the signal-to-noise ratio of the output signal of the button body placement portion A1 and the signal-to-noise ratio of the output signal of the touch control portion A2 in real time through the computing unit 40, so as to simplify computing resources required by the touch device 1.

S4: using a balancing unit to regulate the touch screen according to the parameter adjustment amount.

By directly executing the parameter adjustment amount obtained by the computing unit 40 through the balancing unit 50, the present application can balance the signal-to-noise ratio of the button body placement portion A1 and the touch control portion A2 in the touch device 1 in real time to improve the accuracy of identifying the output signals of the button body placement portion A1 and the touch control portion A2.

In another embodiment provided by the present application, the touch device control method further includes: pressing the capacitive button 10 to electrically connect the contact portion 11 of the capacitive button 10 to the touch screen 20. Thus, the touch device 1 of the present application can provide two operation modes: touch operation and button pressing operation.

In another embodiment provided by the present application, the touch device control method further includes: pressing a capacitive button to compress an elastic portion 12 so that the contact portion 11 located at a lower edge of the elastic portion 12 is electrically connected to the touch screen 20. Thus, the touch device 1 of the present application can provide both touch operation and button pressing operation, and provide elastic pressing feedback at the button body placement portion A1.

Please refer to FIG. 7, which is a flowchart of a touch device control method according to another embodiment of the present application. The touch device control method further includes:

S21: using the sensing device to sense the first data including elastic portion charge state data of the elastic portion that changes with a deformation quantity of the elastic portion.

S22: using the computing unit to calculate the parameter adjustment amount according to the first data including the elastic portion charge state data.

By using the first data sensed by the sensing device 30 including the charge change caused by the deformation of the elastic portion 12 due to the force, the present application can further obtain a more accurate signal adjustment amount of the output signals of the button body placement portion A1 and the touch control portion A2 through the computing unit 40 according to the pressing state of the elastic portion 12. Therefore, compared to simply adding a button, the capacitive button 10 disposed on the main body placement portion A1 of the touch device 1 provided in the present application can also output different signals according to different pressing states.

Please refer to FIG. 8, which is a flowchart of a touch device control method according to another embodiment of the present application. The touch device control method further includes:

S31: using the computing unit to calculate a signal output threshold value according to the first data.

S32: using the computing unit to determine whether the output signal generated at the button body placement portion is greater than the signal output threshold value.

When the output signal is greater than the signal output threshold value, the touch screen is used to receive the output signal.

Thus, when the capacitive button 10 disposed on the button body placement portion A1 of the touch device 1 provided in the present application is slightly pressed but the pressing state does not meet a pressing threshold that complies with conductivity data, a signal output by the capacitive button 10 disposed on the button body placement portion A1 is not received by the touch screen 20. Therefore, a situation that the output signal interferes with an operation of the touch device I due to the capacitive button 10 disposed on the button body placement portion A1 being slightly pressed is further prevented.

It should be further explained that, since a button structure of the touch device 1 provided in the present application can be directly achieved by placing the capacitive button 10 at any position on the touch screen 20 and then balancing operating parameters of the touch screen 20 through the sensing device 30, the computing unit 40, and the balancing unit 50, application fields of the additional button will no longer be limited by a mold and a matching circuit like an additional button of a traditional panel. For example, the touch device 1 provided in the present application may include panels disposed in different application fields such as an advertising panel, a vehicle dashboard, a tablet computer, or a washing machine, an ATM panel, etc.

The present application has at least the following beneficial effects. The present application provides the touch device and the control method thereof. The capacitive button 10 is disposed on the touch screen 20. The conductivity data of the button body placement portion A1 and the touch control portion A2 are sensed in real time through the sensing device 30, so as to balance the signal-to-noise ratio of the output signals in different regions of the touch device 1 through the computing unit 40 and the balancing unit 50. In this way, the button element can provide physical feedback on the touch screen 20 by utilizing a simplified system design without limiting the original functions of the touch screen 20. At the same time, the touch device with the additional panel button can have a faster response speed and the applicable fields of the touch device are not limited.

It should be noted that a combination of various elements in the present application preferably forms the above-mentioned multiple embodiments, but this should not be interpreted as a limitation on the present application, that is, the various elements in the present application can also have more combinations and are not limited to the above-mentioned multiple embodiments.

This description uses specific examples to illustrate the principles and implementation methods of the present application. The description of the above embodiments is only used to help understand the technical solutions and core ideas of the present application. Those skilled in the art should understand that they can still modify the technical solutions described in the aforementioned embodiments, or make equivalent substitutions for some of the technical features therein, and these modifications or substitutions do not cause the essence of the corresponding technical solutions to deviate from the scope of the technical solutions of the embodiments of this application.

What is claimed is:

1. A touch device, comprising:
 a touch screen having a button body placement portion and a touch control portion located outside the button body placement portion;
 a capacitive button disposed on the touch screen and in the button body placement portion;
 a sensing device connected to the touch screen and the capacitive button and configured to sense first data at the button body placement portion and second data at the touch control portion;
 a computing unit connected to the sensing device and the touch screen and configured to calculate a parameter adjustment amount for balancing a signal-to-noise ratio of an output signal of the button body placement portion and a signal-to-noise ratio of an output signal of the touch control portion based on the first data, the second data, and an output signal of the touch screen; and
 a balancing unit connected to the computing unit and the touch screen and configured to regulate the touch screen according to the parameter adjustment amount.

2. The touch device according to claim 1, wherein the capacitive button comprises a contact portion, and when the capacitive button is pressed down, the contact portion is electrically connected to the touch screen.

3. The touch device according to claim 2, wherein the capacitive button further comprises an elastic portion, the contact portion is connected to the elastic portion and is located at a lower edge of the elastic portion, and when the capacitive button is pressed down, the elastic portion is compressed to electrically connect the contact portion to the touch screen.

4. The touch device according to claim 3, wherein the elastic portion is made of a conductive material, and an elastic portion charge of the elastic portion changes with a deformation quantity of the elastic portion, and the first data sensed by the sensing device further comprises elastic portion charge state data of a change amount in the elastic portion charge; and
 the computing unit is further configured to calculate the parameter adjustment amount according to the first data comprising the elastic portion charge state data.

5. The touch device according to claim 1, wherein the computing unit is further configured to calculate a signal output threshold value according to the first data;

the computing unit is further configured to determine whether the output signal generated at the button body placement portion is greater than the signal output threshold value;

when the output signal is greater than the signal output threshold value, the touch screen receives the output signal.

6. A touch device control method, comprising:

using a touch screen provided with a capacitive button, the touch screen having a button body placement portion for placing the capacitive button and a touch control portion located outside the button body placement portion;

using a sensing device to sense first data at the button body placement portion and second data at the touch control portion in real time;

using a computing unit to calculate a parameter adjustment amount for balancing a signal-to-noise ratio of an output signal of the button body placement portion and a signal-to-noise ratio of an output signal of the touch control portion based on the first data and the second data; and using a balancing unit to regulate the touch screen according to the parameter adjustment amount.

7. The touch device control method according to claim 6, further comprising:

pressing the capacitive button to electrically connect a contact portion of the capacitive button and the touch screen.

8. The touch device control method according to claim 7, further comprising:

pressing the capacitive button to compress an elastic portion of the capacitive button so that the contact portion located at a lower edge of the elastic portion is electrically connect to the touch screen.

9. The touch device control method according to claim 8, further comprising:

using the sensing device to sense the first data comprising elastic portion charge state data of the elastic portion that changes with a deformation quantity of the elastic portion;

using the computing unit to calculate the parameter adjustment amount according to the first data comprising the elastic portion charge state data.

10. The touch device control method according to claim 6, further comprising:

using the computing unit to calculate a signal output threshold value according to the first data; and using the computing unit to determine whether the output signal generated at the button body placement portion is greater than the signal output threshold value;

using the touch screen to receive the output signal when the output signal is greater than the signal output threshold value.

* * * * *